United States Patent
Diepenbrock et al.

(10) Patent No.: US 8,516,724 B2
(45) Date of Patent: Aug. 27, 2013

(54) DEVICE FOR DISPLAYING IMAGE ON APPAREL

(75) Inventors: James E. Diepenbrock, Aloha, OR (US); Connie A. Sarkinen, Brush Prairie, WA (US); Todd A. Waatti, Battleground, WA (US)

(73) Assignee: NIKE, Inc., Beaverton, OR (US)

( * ) Notice: Subject to any disclaimer, the term of this patent is extended or adjusted under 35 U.S.C. 154(b) by 478 days.

(21) Appl. No.: 12/779,389

(22) Filed: May 13, 2010

(65) Prior Publication Data
US 2011/0277352 A1 Nov. 17, 2011

(51) Int. Cl.
*A43B 23/00* (2006.01)

(52) U.S. Cl.
USPC ................................ 36/136; 36/112; 428/172

(58) Field of Classification Search
USPC ............. 36/112, 136, 45; 428/172; 264/293, 264/218
See application file for complete search history.

(56) References Cited

U.S. PATENT DOCUMENTS

| | | | | |
|---|---|---|---|---|
| 2,294,865 A | * | 9/1942 | Frankenthal et al. | 264/132 |
| 2,731,672 A | * | 1/1956 | Davis et al. | 264/132 |
| 3,417,175 A | * | 12/1968 | Brown et al. | 264/220 |
| 3,632,695 A | * | 1/1972 | Howell | 264/2.5 |
| 3,709,766 A | | 1/1973 | Brody | |
| 4,050,167 A | * | 9/1977 | Senter | 36/32 R |
| 4,385,360 A | | 5/1983 | Yamada et al. | |
| 4,414,731 A | | 11/1983 | Riemer | |
| 4,546,019 A | * | 10/1985 | Schneider | 428/13 |
| 4,712,314 A | * | 12/1987 | Sigoloff | 36/112 |
| 4,837,960 A | | 6/1989 | Skaja | |
| 5,401,457 A | | 3/1995 | Valyi | |
| 5,571,598 A | | 11/1996 | Butler et al. | |
| 5,839,211 A | | 11/1998 | Pallera | |
| 5,925,426 A | | 7/1999 | Galerneau | |
| 5,965,221 A | * | 10/1999 | Messenger | 428/13 |
| 6,287,492 B1 | * | 9/2001 | Goldfarb et al. | 264/40.5 |
| 6,306,470 B1 | | 10/2001 | Goldfarb et al. | |
| 6,444,148 B2 | | 9/2002 | Harding | |
| 6,455,128 B1 | * | 9/2002 | Moon | 428/138 |
| 6,957,504 B2 | * | 10/2005 | Morris | 36/136 |
| 2004/0148805 A1 | * | 8/2004 | Morris | 36/112 |

(Continued)

FOREIGN PATENT DOCUMENTS

EP 1119448 5/2003
EP 1318003 6/2003

(Continued)

OTHER PUBLICATIONS

Written Opinion dated May 23, 2011, International Application No. PCT/US2011/029302, International Filing Date Mar. 22, 2011.

(Continued)

*Primary Examiner* — Marie Patterson
(74) *Attorney, Agent, or Firm* — Plumsea Law Group, LLC

(57) ABSTRACT

An image displaying device includes a background layer that is substantially opaque. The device also includes a display layer that is semi-transparent. The display layer includes an inner surface facing the background layer, and the inner surface is substantially smooth. The display layer further includes an outer surface facing away from the background layer, and the outer surface includes a plurality of raised areas and a plurality of recessed areas. The display layer has increased light transmissivity through the recessed areas and decreased light transmissivity through the raised areas such that a contrast of light transmissivity between the raised and recessed areas generates an image.

22 Claims, 2 Drawing Sheets

(56) References Cited

U.S. PATENT DOCUMENTS

| | | | |
|---|---|---|---|
| 2005/0016028 A1* | 1/2005 | Safdeye | 36/132 |
| 2006/0151989 A1 | 7/2006 | Muke et al. | |
| 2006/0228525 A1 | 10/2006 | Dakowski | |
| 2007/0199913 A1 | 8/2007 | Kelley et al. | |
| 2008/0033593 A1 | 2/2008 | Dufort | |
| 2008/0163514 A1* | 7/2008 | Stassinopoulos | 36/100 |

FOREIGN PATENT DOCUMENTS

| | | |
|---|---|---|
| GB | 2376915 | 12/2002 |
| JP | 2002109314 | 4/2002 |
| WO | WO 0056558 | 9/2000 |
| WO | WO 02080135 | 10/2002 |

OTHER PUBLICATIONS

International Search Report dated May 23, 2011, International Application No. PCT/US2011/029302, International Filing Date Mar. 22, 2011.

\* cited by examiner

DEVICE FOR DISPLAYING IMAGE ON APPAREL

FIELD

The present disclosure relates to device for displaying an image and, more particularly, relates to a device for displaying an image on apparel.

BACKGROUND

Many objects include certain features that improve the aesthetics of the object and make the object more fashionable and unique. For instance, articles of footwear, such as shoes, boots, sandals, and the like can include various color coordinated portions, designs, decals, ornamental stitching, and the like.

However, these features may be only two dimensional, and/or the features may not include a high degree of detail. This may be because of manufacturing constraints, cost, and the like. As such, the features may lack some visual and/or tactile appeal.

Furthermore, lithophanes are devices made out of a rigid material having a thickness that varies across its width and length. The variations in thickness correspond to a predetermined image, and when the lithophane is backlit, the image appears. This image can have a high degree of detail.

However, it may be difficult or impractical for incorporating a lithophane into certain objects. For instance, backlighting the lithophane may be problematic for certain objects, such as articles of footwear, because there is relatively little space to include a light source. Also, since the lithophane is typically rigid, it may be difficult to incorporate the lithophane in an flexible object. Moreover, in order for the image to be highly detailed, the lithophane itself should be highly detailed, and as such, manufacturing such an object with a lithophane can be inefficient and expensive.

SUMMARY

Accordingly, despite the improvements of known devices described above, there remains a need for an image displaying device that includes a background layer that is substantially opaque. The device also includes a display layer that is semi-transparent. The display layer includes an inner surface facing the background layer, and the inner surface is substantially smooth. The display layer further includes an outer surface facing away from the background layer, and the outer surface includes a plurality of raised areas and a plurality of recessed areas. The display layer has increased light transmissivity through the recessed areas and decreased light transmissivity through the raised areas such that a contrast of light transmissivity between the raised and recessed areas generates an image.

A method of displaying an image is also disclosed. The method includes generating an image on a display layer. The display layer includes an inner surface that is substantially smooth, and the display layer further includes an outer surface including a plurality of raised areas and a plurality of recessed areas. The display layer has increased light transmissivity through the recessed areas and decreased light transmissivity through the raised areas such that a contrast of light transmissivity between the raised and recessed areas generates the image. Moreover, the method includes operatively supporting the display layer on a substantially opaque background layer such that the inner surface faces the background layer and the outer surface faces away from the background layer.

Moreover, an article of footwear is disclosed that includes an upper having a flexible background layer that is substantially opaque. The background layer includes an outer surface that is substantially smooth. The article of footwear also includes a flexible display layer that is fixed to the outer surface of the background layer. The display layer is semi-transparent and polymeric, and the display layer includes an inner surface that faces and directly abuts the outer surface of the background layer. The inner surface is substantially smooth. Also, the display layer further includes an outer surface facing away from the background layer, and the outer surface of the display layer includes a plurality of raised areas and a plurality of recessed areas. Moreover, the display layer includes a coloring agent having a higher concentration in the plurality of raised areas as compared with the plurality of recessed areas. The display layer has increased light transmissivity through the recessed areas and decreased light transmissivity through the raised areas such that a contrast of light transmissivity between the raised and recessed areas generates an image.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is a schematic view of a process for making a mold for manufacturing the article of footwear of FIG. 1.

Corresponding reference numerals indicate corresponding parts throughout the several views of the drawings.

DETAILED DESCRIPTION

Example embodiments will now be described more fully with reference to the accompanying drawings.

Figure 1:
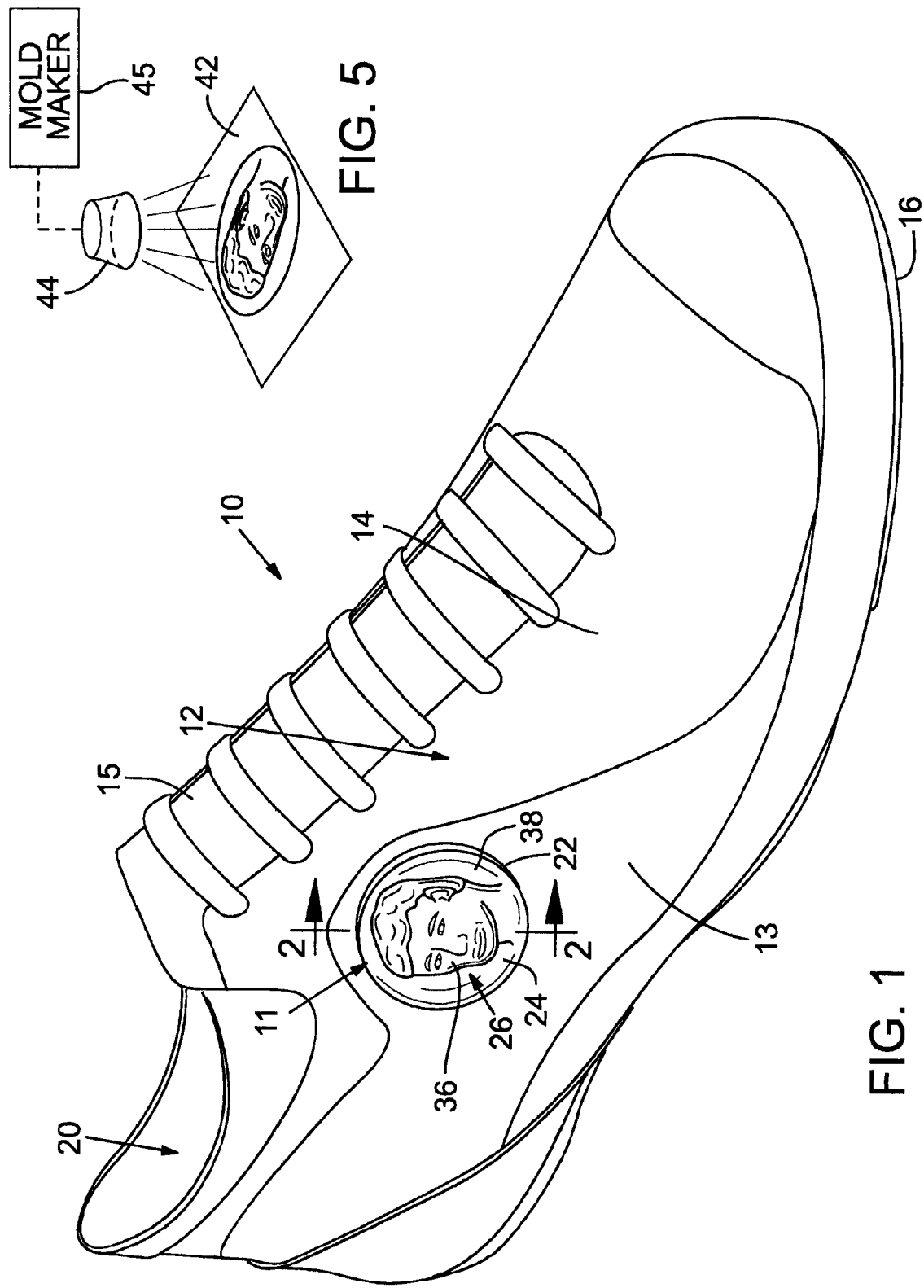
FIG. 1 is a perspective view of an exemplary embodiment of an article of footwear according to various teachings of the present disclosure.
Figure 2:
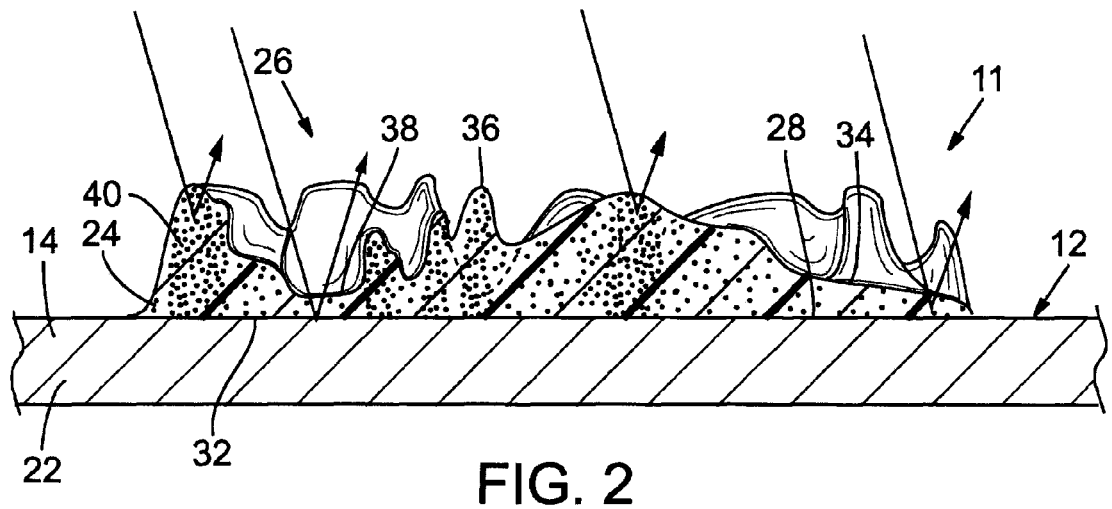
FIG. 2 is a cross sectional view of the article of footwear taken along the line 2-2 of FIG. 1.

Referring initially to FIGS. 1 and 2, an object 10 with an image displaying device 11 is illustrated according to various exemplary embodiments of the present disclosure. As shown, the object 10 can be an article of footwear 12; however, it will be appreciated that the object 10 can be of any suitable type, such as other apparel (e.g., hat, shirt, pants), accessories (e.g., pendant, headband), luggage, equipment, a case for a music player, etc. Also, as shown in FIG. 1, the article of footwear 12 can be a shoe; however, it will be appreciated that the article of footwear 12 can be a boot, a sandal, slipper, or any other suitable type of footwear 12.

The article of footwear 12 can include a sole assembly 16. The sole assembly 16 can include an outsole (not specifically shown) for providing traction for the footwear 12. Also, the sole assembly 16 can include a midsole (not specifically shown) for providing cushioned support for the wearer of the footwear 12. Moreover, the article of footwear 12 can include an upper 14. The upper 14 can include a plurality of overlapping panels of material that define a cavity 20 for receiving the wearer's foot. The upper 14 can be made out of any suitable material, such as leather, nylon, etc. The upper 14 can also include laces, straps, pile tape, or other features for securing the wearer's foot inside the cavity 20 of the footwear 12.

As stated above, the article of footwear 12 can also include the image displaying device 11. The image displaying device 11 can be disposed in any suitable location on the footwear 12, such as the upper 14. More specifically, in the embodiments represented in FIG. 1, the image displaying device 11 can be disposed on a lateral side panel 13 of the upper 14; however, the image displaying device 11 could also be disposed on a tongue 15, strap, or any other suitable location on the upper 14. Also, in some embodiments, the image displaying device 11 can be disposed on the sole assembly 16, for instance, on a sidewall of the midsole, on an exposed sidewall of a fluid-filled bladder, or on the outsole of the sole assembly 16.

The image displaying device 11 can be similar to a lithophane; however, the image displaying device 11 can include several features that allows an image 26 to be displayed without backlighting. Also, the image displaying device 11 can be flexible such that the image displaying device 11 can be incorporated in a wider range of objects 10 than traditional lithophanes. In addition, the image displaying device 11 can be manufactured more efficiently than traditional lithophanes as will be discussed in greater detail below.

Generally, the image displaying device 11 can include a background layer 22 and a display layer 24 (FIG. 2). The display layer 24 can display the image 26 as will be discussed in greater detail below. As shown, the image 26 can be a three-dimensional image. Also, the image 26 can be highly detailed. For instance, the image 26 can be a photorealistic face of a person, which includes hair and skin texture, musculature, and the like, in some embodiments. However, it will be appreciated that the image 26 can be of any object, design, logo, trademark, etc. without departing from the scope of the present disclosure. The image 26 can significantly enhance the aesthetics of the footwear 12. Also, the image displaying device 11 can be manufactured in a highly efficient, relatively low cost manner as will be discussed.

The background layer 22 can be made from any suitable material. For instance, the background layer 22 can be made from a flexible material, such as leather, nylon, etc. In some embodiments, the background layer 22 can be located on or incorporated in the upper 14. For instance, the background layer 22 can form a portion of and can be integral to the upper 14. In other embodiments, the background layer 22 can overlap the upper 14 and can be removably coupled to the upper 14, for instance, by stitching, adhesives, and the like. As stated, the image displaying device 11 can be incorporated in any suitable object, such as apparel other than the footwear 12; thus, in these embodiments, the background layer 22 can be defined by the material of a T-shirt, the strap of a piece of baggage, etc.

Furthermore, as shown in FIG. 2, the background layer 22 can include an outer surface 28 and an inner surface 30. The inner surface 30 can face the cavity 20 of the footwear 12. The outer surface 28 can be opposite the inner surface 30. Also, the outer surface 28 can also be substantially smooth.

Moreover, the background layer 22 can be substantially opaque. Thus, light is less likely to pass through the background layer 22. It will be appreciated that the background layer 22 can be of any suitable color.

As stated above, the image displaying device 11 can include a display layer 24. The display layer 24 can be made out of any suitable material. For instance, the display layer 24 can be made out of a clear, semi-transparent, polymeric, flexible material, such as urethane. Also, in some embodiments, the display layer 24 can include a thermoplastic nonwoven material, such as those materials disclosed in U.S. patent application Ser. No. 12/367,274, filed Feb. 6, 2009, which is incorporated herein by reference in its entirety. Moreover, in some embodiments, the display layer 24 can include a coloring agent 40 (FIG. 2), such as a tinting agent or flecks of reflective material, that is suspended in a clear or otherwise semi-transparent matrix material. The coloring agent 40 can cause the display layer 24 to contrast with the color of the background layer 22 to make the image 26 even more visible. However, it will be appreciated that the coloring agent 40 is optional, and the display layer 24 can be clear and transparent without departing from the scope of the present disclosure.

As shown in FIG. 2, the display layer 24 can include an inner surface 32 and an outer surface 34. The inner surface 32 can be substantially smooth and can face the background layer 22. The inner surface 32 can be operatively supported on the outer surface 28 of the background layer 22. In some embodiments, the inner surface 32 can directly abut and can be fixed to the outer surface 28 of the background layer 22. The outer surface 34 can be opposite the inner surface 32.

Furthermore, as shown in FIG. 2, the outer surface 28 can include a plurality of raised areas 36 and a plurality of recessed areas 38. As such, the display layer 24 can be thicker at the raised areas 36 and can be thinner at the recessed areas 38. As will be discussed, the raised areas 36 and the recessed areas 38 can be disposed at predetermined positions corresponding to the image 26.

Because the display layer 24 is semi-transparent, light can be travel at least partially through the display layer 24. More specifically, the display layer 24 can have increased light transmissivity through the recessed areas 38. Also, the display layer 24 can have decreased light transmissivity through the raised areas 36.

Figure 3:
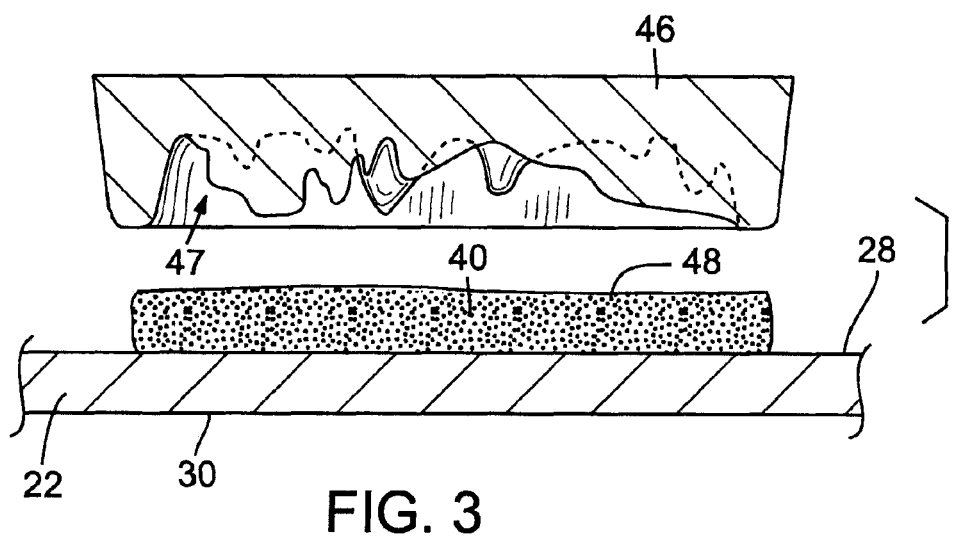
FIG. 3 is a cross sectional view of the article of footwear of FIG. 1 shown during manufacture.

Thus, in the embodiments represented in FIG. 3, light can more readily travel through the thickness of the display layer 24 at the recessed areas 38, and the light can be reflected from the background layer 22. As such, the color of the background layer 22 can show more easily through the display layer 24 at the recessed areas 38. If the background layer 22 is black, the light can be substantially absorbed such that the black of the background layer 22 shows through the recessed areas 38.

Moreover, light can less readily travel through the thickness of the display layer 24 at the raised areas 36, and the light is more likely to be reflected from the display layer 24 without reaching the background layer 22. As such, the color of the background layer 22 is less likely to show through the display layer 24 at the raised areas 36.

Accordingly, this contrast of light transmissivity between the raised areas 36 and recessed areas 38 can generate the image 26. For instance, the higher the thickness of the display layer 24 at a particular raised area 36, the lighter that particular raised area 36 can appear, and the lower the thickness of the display layer 24 at a particular recessed area 38, the darker that particular recessed area 38 can appear. As shown in FIG. 2, the display layer 24 can have very smooth and continuous transitions in thickness between the raised and recessed areas 36, 38 and, as such, the image 26 can be highly detailed, photorealistic, and three-dimensional. Accordingly, the footwear 12 can be more aesthetically pleasing. Furthermore, because the outer surface 34 is contoured, the display layer 24 can be pleasing to touch.

In addition, as shown in FIG. 2, the coloring agent 40 can accumulate at a higher concentration in the raised areas 36 as compared to the recessed areas 38. If the coloring agent 40 is a tinting agent, the higher concentrations can cause the raised areas 36 to appear darker in color than the recessed areas 38. If the coloring agent 40 includes flecks of reflective material, the raised areas 36 can be more reflective than the recessed areas 38. This can be achieved using various manufacturing techniques as will be discussed in greater detail below. As such, the image 26 can display a higher contrast between the raised areas 36 and the recessed areas 38 for even greater visibility.

Figure 4:
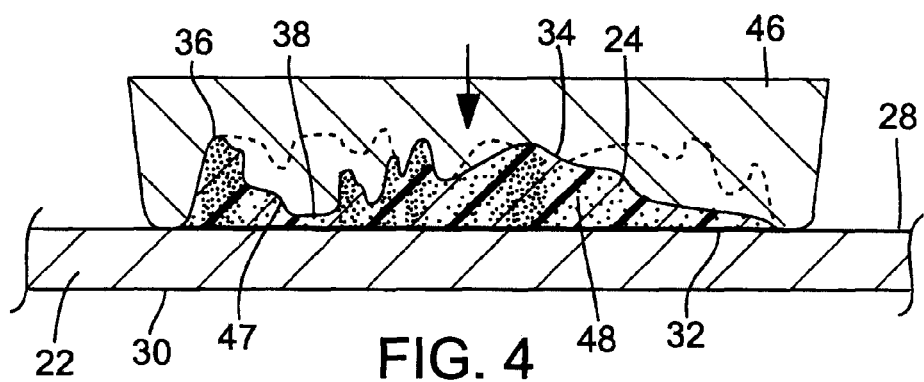
FIG. 4 is a cross sectional view of the article of footwear of FIG. 1 shown during manufacture.

Referring to FIGS. 3-5, exemplary embodiments of methods of manufacturing the footwear 12 are illustrated. As shown in FIG. 5, the method can include scanning an image 42 with a scanning device 44. The image 42 can be of any type, such as a photograph, a signature, a logo, or any other image 42, which the user desires to be the image 26 on the footwear 12. The scanning device 44 can be operatively connected to software, such as CAD/CAM software (e.g., DEL-CAM software commercially available from DelCam PLC of the United Kingdom). Thus, the scanning device 44 can electronically map each pixel of the image 42 and generate an electronic (e.g., digital) copy of the image 42.

Also, the scanning device 44 can be operatively connected to a mold making device 45 that can receive the electronic copy of the image 42 and that can create a mold 46 (FIG. 3). The mold making device 45 can include a mill or other device for creating the mold 46. More specifically, the mold making device 45 can create a cavity 47 in the mold 46 that corresponds to the raised areas 36 and recessed areas 38 of the display layer 24. The mold 46 can be made out of any suitable material, such as metal, polymer, etc.

As shown in FIG. 3, a blank 48 can be applied to the background layer 28. As will be discussed, the display layer 24 can be formed by molding the blank 48. In some embodiments, the blank 48 can be a substantially rectangular, solid piece of material. Additionally, as shown in FIG. 3, the blank 48 can include the coloring agent 40, and the coloring agent 40 can be substantially evenly dispersed in the blank 48.

Also, in some embodiments represented in FIG. 3, the blank 48 can be laid on top of the background layer 28 without being affixed to the background layer 28; however, the blank 48 can be attached to the background layer 28 without departing from the scope of the present disclosure. This can occur either before or after the background layer 28 is coupled to the other portions of the footwear 12. Also, the blank 48 can be at room temperature when positioned on the background layer 28.

Then, as shown in FIG. 4, the mold 46 can be pressed against the blank 48 and the background layer 22 such that the mold 46 deforms the blank 48 and causes the blank 48 to substantially fill the cavity 47 (i.e., compression molding). In some embodiments, the mold 46 can be heated above room temperature before being pressed against the blank 48 and background layer 22, and the elevated heat and pressure from the mold 46 can cause the blank 48 to deform to the shape of the cavity 47. It will be appreciated that the heat of the mold 46, the pressure applied by the mold 46, and other manufacturing variables can be adjusted according to the individual displaying device 11 being manufactured.

Moreover, in some embodiments, the heat and pressure from the mold 46 can move the coloring agent 40 within the blank 48. For instance, in some embodiments, the heat and pressure from the mold 46 can cause the coloring agent 40 to concentrate in the raised areas 36. As such, the coloring agent 40 can be at a higher concentration in the raised areas 36 as compared to the recessed areas 38. Accordingly, the different concentrations of the coloring agent 40 can cause the raised areas 36 to be further contrasted from the recessed areas 38.

After being deformed by the mold 46, the blank 48 can be cured (e.g., via cooling, UV curing, etc.) to re-solidify and form the display layer 24. Curing can also cause the display layer 24 to fully adhere to and become fixed to the background layer 22, and the mold 46 can be withdrawn. As such, the display layer 24 (and the image 26) can be created at substantially the same time as the display layer 24 is fixed to the background layer 22. Accordingly, manufacturing the footwear 12 can be very efficient with a high-throughput.

In other embodiments, the mold 46 can be pressed against the background layer 22, and then the cavity 47 can be filled with material, which is then cured within the cavity 47 to form the display layer 24 and to fix the display layer 24 to the background layer 22. Moreover, in some embodiments, the cavity 47 of the mold 46 is filled with material, the background layer 22 is laid over the cavity 47, and the material in the mold 46 is cured within the cavity 47 to form the display layer 24 and to fix the display layer 24 to the background layer 22.

In still other embodiments, the display layer 24 can be molded or cast separate from the background layer 22, and then the formed display layer 24 can be subsequently fixed to the background layer 22.

Thus, the footwear 12 can be very aesthetically pleasing because of the highly detailed and unique image 26 displayed by the image displaying device 11. The image displaying device 11 can also provide a unique tactile quality for the footwear 12. Furthermore, the image displaying device 11 can be manufactured in a highly efficient manner.

Moreover, the footwear 12 can be customized to include a customized image 26. For instance, the image displaying device 11 can be an option for users in a customization process. More specifically, the user can customize the footwear 12 by transmitting a desired image 42 to a manufacturer of the footwear 12. The manufacturer can then make the electronic copy of the image 42 that is used to make the mold 46, and then the image displaying device 11 can be formed as discussed above and included on the footwear 12. For instance, this type of system can be incorporated in the NIKEID™ system offered by Nike, Inc. of Beaverton, Oreg. In other embodiments, the image display device 11 can be formed and/or attached to the footwear 10 in a retail setting in a relatively short period of time.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An image displaying device comprising:
a background layer that is opaque; and
a display layer that is semi-transparent, the display layer including an inner surface facing the background layer, the inner surface being substantially smooth, the display layer further including an outer surface facing away from the background layer, the outer surface including a plurality of raised areas and a plurality of recessed areas that are arranged in an irregular pattern and in predetermined positions corresponding to an image, the display layer having increased light transmissivity through the recessed areas and decreased light transmissivity through the raised areas such that a contrast of light transmissivity between the raised and recessed areas generates the image.

2. The image displaying device of claim 1, wherein the display layer and the background layer are flexible.

3. The image displaying device of claim 1, wherein the display layer is at least partially polymeric.

4. The image displaying device of claim 3, wherein the display layer includes a urethane material.

5. The image displaying device of claim 1, wherein the display layer includes a coloring agent.

6. The image displaying device of claim 5, wherein the coloring agent is at least one of a tinting agent and a plurality of flecks of reflective material.

7. The image displaying device of claim 5, wherein the coloring agent has a higher concentration in the plurality of raised areas as compared to the plurality of recessed areas.

8. The image displaying device of claim 1, wherein the inner surface directly abuts the background layer.

9. The image displaying device of claim 8, wherein the background layer includes an outer surface against which the inner surface of the display layer abuts, and wherein the outer surface of the background layer is substantially smooth.

10. The image displaying device of claim 1, wherein the background layer has a color, the color of the background layer showing more through the recessed areas than the raised areas.

11. The image displaying device of claim 1, wherein the background layer is a part of an article of footwear.

12. The image displaying device of claim 11, wherein the background layer is a part of an upper of the article of footwear.

13. A method of displaying an image comprising:
generating an image on a display layer, the display layer including an inner surface that is substantially smooth, the display layer further including an outer surface including a plurality of raised areas and a plurality of recessed areas that are arranged in an irregular pattern and in predetermined positions corresponding to the image, the display layer having increased light transmissivity through the recessed areas and decreased light transmissivity through the raised areas such that a contrast of light transmissivity between the raised and recessed areas generates the image; and
operatively supporting the display layer on an opaque background layer such that the inner surface faces the background layer and the outer surface faces away from the background layer.

14. The method of claim 13, wherein the generating the image and the operatively supporting the display layer occurs substantially simultaneously.

15. The method of claim 14, further comprising introducing a blank between a mold and the background layer, pressing the mold against the blank and the background layer to deform the blank and create the plurality of raised and recessed areas, and curing the deformed blank to fix the deformed blank to the background layer.

16. The method of claim 13, wherein the generating the image includes one of casting and thermoforming the display layer.

17. The method of claim 13, wherein generating the image includes scanning the image to generate an electronic copy of the image, and creating a mold from the electronic copy, and forming the plurality of raised and recessed areas using the mold.

18. The method of claim 13, further comprising including a coloring agent in the display layer.

19. The method of claim 18, further comprising concentrating the coloring agent in the plurality of raised areas such that the coloring agent has a higher concentration in the plurality of raised areas as compared to the plurality of recessed areas.

20. The method of claim 13, wherein the display layer is at least partially polymeric.

21. The method of claim 13, further comprising fixing the display layer to an article of footwear, the article of footwear including the background layer.

22. An image displaying device comprising:
a background layer that is substantially opaque; and
a display layer that is semi-transparent, the display layer including an inner surface facing the background layer, the inner surface being substantially smooth, the display layer further including an outer surface facing away from the background layer, the outer surface including a plurality of raised areas and a plurality of recessed areas, the display layer having increased light transmissivity through the recessed areas and decreased light transmissivity through the raised areas such that a contrast of light transmissivity between the raised and recessed areas generates an image, the display layer including a coloring agent that has a higher concentration in the plurality of raised areas as compared to the plurality of recessed areas.

* * * * *